(12) United States Patent
Yang et al.

(10) Patent No.: US 8,463,045 B2
(45) Date of Patent: Jun. 11, 2013

(54) HIERARCHICAL SPARSE REPRESENTATION FOR IMAGE RETRIEVAL

(75) Inventors: Linjun Yang, Beijing (CN); Qi Tian, Helotes, TX (US); Bingbing Ni, Sinapore (SG)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 12/943,805

(22) Filed: Nov. 10, 2010

(65) Prior Publication Data
US 2012/0114248 A1    May 10, 2012

(51) Int. Cl.
G06K 9/46    (2006.01)
G06K 9/36    (2006.01)
G06K 9/54    (2006.01)

(52) U.S. Cl.
USPC ........................... 382/190; 382/232; 382/305

(58) Field of Classification Search
USPC ................. 382/159, 181, 190, 232, 240, 248, 382/276, 305, 312; 375/240.18, 240.19; 358/1.16, 522
See application file for complete search history.

(56) References Cited

U.S. PATENT DOCUMENTS

| | | | |
|---|---|---|---|
| 6,285,995 B1 | 9/2001 | Abdel-Mottaleb et al. | |
| 6,408,293 B1 | 6/2002 | Aggarwal et al. | |
| 6,744,935 B2 | 6/2004 | Choi et al. | |
| 6,847,733 B2 | 1/2005 | Savakis et al. | |
| 7,065,521 B2 | 6/2006 | Li et al. | |
| 7,099,860 B1 | 8/2006 | Liu et al. | |
| 7,113,944 B2 | 9/2006 | Zhang et al. | |
| 7,240,075 B1 | 7/2007 | Nemirofsky et al. | |
| 7,624,337 B2 | 11/2009 | Sull et al. | |
| 7,801,893 B2 | 9/2010 | Gulli' et al. | |
| 2001/0056415 A1 | 12/2001 | Zhu et al. | |
| 2002/0136468 A1 | 9/2002 | Sun | |
| 2004/0111453 A1 | 6/2004 | Harris et al. | |
| 2004/0175041 A1 | 9/2004 | Miller | |
| 2004/0249801 A1 | 12/2004 | Kapur | |
| 2005/0057570 A1 | 3/2005 | Cosatto et al. | |
| 2005/0192992 A1 | 9/2005 | Reed et al. | |
| 2006/0112092 A1 | 5/2006 | Ziou et al. | |
| 2007/0104378 A1 | 5/2007 | Aguera Y Arcas | |
| 2007/0214172 A1 | 9/2007 | Nister et al. | |
| 2007/0259318 A1 | 11/2007 | Harrison | |

(Continued)

FOREIGN PATENT DOCUMENTS

| | | |
|---|---|---|
| KR | 0785928 B1 | 7/2007 |
| WO | WO9945483 A1 | 9/1999 |
| WO | WO2006005187 A1 | 1/2006 |

OTHER PUBLICATIONS

Office Action for U.S. Appl. No. 12/938,310, mailed on Apr. 11, 2012, Linjun Yang, "Adaptive Image Retrieval Database," 12 pages.

(Continued)

*Primary Examiner* — Kanjibhai Patel
(74) *Attorney, Agent, or Firm* — Lee & Hayes, PLLC

(57) ABSTRACT

A hierarchical sparse codebook allows efficient search and comparison of images in image retrieval. The hierarchical sparse codebook includes multiple levels and allows a gradual determination/classification of an image feature of an image into one or more groups or nodes by traversing the image feature through one or more paths to the one or more groups or nodes of the codebook. The image feature is compared with a subset of nodes at each level of the codebook, thereby reducing processing time.

20 Claims, 6 Drawing Sheets

U.S. PATENT DOCUMENTS

2007/0288453 A1 12/2007 Podilchuk
2009/0125510 A1 5/2009 Graham et al.
2009/0171929 A1 7/2009 Jing et al.
2010/0088342 A1 4/2010 Ji et al.

OTHER PUBLICATIONS

Extended European Search Report mailed Aug. 11, 2011 for European patent application No. 09755475.2, 9 pages.
Gevers et al., "The PicToSeek WWW Image Search System," Proceedings of the IEEE International Conference on Multimedia Computing and Systems, vol. 1, Jun. 7, 1999, Florence, Italy, pp. 264-269.
Qi et al., "Image Retrieval Using Transaction-Based and SVM-Based Learning in Relevance Feedback Sessions," Image Analysis and Recognition; (Lecture Notes in Computer Science), Aug. 22, 2007, Heidelbert, Berlin, pp. 638-649.
Torres et al., "Semantic Image Retrieval Using Region-Base Relevance Feedback," Adaptive Multimedia Retrieval: User, Context, and Feedback (Lecture Notes in Computer Science; LNCS), Heidelberg, Berlin, 2007, pp. 192-206.
Yang et al., "Learning Image Similarities and Categories from Content Analysis and Relevance Feedback," Proceedings ACM Multimedia 2000 Workshops, Marina Del Rey, CA, Nov. 4, 2000, vol. CONF. 8, pp. 175-178.
Abdel-Mottaleb, et al., "Performance Evaluation of Clustering Algorithms for Scalable Image Retrieval", retrieved on Jul. 30, 2010 at <<http://www.umiacs.umd.edu/~gopal/Publications/cvpr98.pdf>>, John Wiley—IEEE Computer Society, Empirical Evaluation Techniques in Computer Vision, Santa Barbara, CA, 1998, pp. 45-56.
Baumberg, "Reliable Feature Matching Across Widely Separated Views", retrieved on Jul. 30, 2010 at <<http://citeseerx.ist.psu.edu/viewdoc/download?doi=10.1.1.21.1666&rep=rep1&type=pdf>>, IEEE, Proceedings of Conference on Computer Vision and Pattern Recognition (CVPR), Hilton Head Island, SC, vol. 1, 2000, pp. 774-781.
Beckmann, et al., "The R-Tree: An Efficient and Robust Access Method for Points and Rectangles", retrieved on Jul. 30, 2010 at <<http://epub.ub.uni-muenchen.de/4256/1/31.pdf>>, ACM, SIGMOD Record, vol. 19, No. 2, Jun. 1990, pp. 322-331.
Belussi, et al., "Estimating the Selectivity of Spatial Queries Using the 'Correlation' Fractal Dimension", retrieved on Jul. 30, 2010 at <<http://citeseerx.ist.psu.edu/viewdoc/download?doi=10.1.1.33.4521&rep=rep1&type=pdf>>, Morgan Kaufmann Publishers, Proceedings of International Conference on Very Large Data Bases, 1995, pp. 299-310.
Bengio, et al., "Group Sparse Coding", retrieved on Jul. 7, 2010 at <<http://books.nips.cc/papers/files/nips22/NIPS2009_0865.pdf>>, MIT Press, Advances in Neural Information Processing Systems (NIPS), 2009, pp. 1-8.
Berchtold, et al., "Fast Parallel Similarity Search in Multimedia Databases", retrieved on Jul. 30, 2010 at <<http://citeseerx.ist.psu.edu/viewdoc/download?doi=10.1.1.72.6847&rep=rep1&type=pdf>>, ACM, Proceedings of International Conference on Management of Data, Tucson, Arizona, 1997, pp. 1-12.
Berchtold, et al., "The X-Tree: An Index Structure for High-Dimensional Data", retrieved on Jul. 30, 2010 at <<http://eref.uqu.edu.sa/files/the_x_tree_an_index_structure_for_high.pdf>>, Morgan Kaufmann Publishers, Proceedings of Conference on Very Large Data Bases, Mumbai, India, 1996, pp. 28-39.
Berg, et al., "Shape Matching and Object Recognition using Low Distortion Correspondences", retrieved on Jul. 30, 2010 at <<http://citeseerx.ist.psu.edu/viewdoc/download?doi=10.1.1.128.1762&rep=rep1&type=pdf>>, IEEE Computer Society, Proceedings of Conference on Computer Vision and Pattern Recognition (CVPR), vol. 1, 2005, pp. 26-33.
Berker, et al., "Very-Large Scale Incremental Clustering", retrieved on Jul. 30, 2010 at <<http://www.google.com/search?q=Berker%2C+Very-Large+Scale+Incremental+Clustering&rls=com.microsoft:en-us:IE-SearchBox&ie=UTF-8&oe=UTF-8&sourceid=ie7&rlz=117ADBF>>, Mar. 2007, pp. 1-24.

Can, et al., "Concepts and Effectiveness of the Cover Coefficient Based Clustering Methodology for Text Databases", retrieved on Jul. 30, 2010 at <<http://sc.lib.muohio.edu/bitstream/handle/2374.MIA/246/fulltext.pdf?sequence=1>>, Miami University Libraries, Oxford, Ohio, Technical Report MU-SEAS-CSA-1987-002, Dec. 1987, pp. 1-45.
Cui, et al., "Combining Stroke-Based and Selecion-Based Relevance Feedback for Content-Based Image Retrieval", at <<http://portal.acm.org/citation.cfm?id=1291304#abstract>>, ACM, 2007, pp. 329-332.
Datar, et al., "Locality-Sensitive Hashing Scheme Based on p-Stable Distributions", retrieved on Jul. 30, 2010 at <<http://www.cs.princeton.edu/courses/archive/spr05/cos598E/bib/p253-datar.pdf>>, ACM, Proceedings of Symposium on Computational Geometry (SCG), Brooklyn, New York, 2004, pp. 253-262.
Datta, et al., "Image Retrieval: Ideas, Influences, and Tends of the New Age", at <<http://infolab.stanford.edu/~wangz/project/imsearch/review/JOUR/datta.pdf>>, ACM, 2006, pp. 65.
Faloutsos, et al., "Efficient and Effective Querying by Image Content", retrieved on Jul. 30, 2010 at <<http://citeseerx.ist.psu.edu/viewdoc/download?doi=10.1.1.40.9013&rep=rep1&type=pdf>>, Kluwer Academic Publishers, Hingham, MA, Journal of Intelligent Information Systems, vol. 3, No. 3-4, Jul. 1994, pp. 231-262.
Fraundorfer, et al., "Evaluation of local detectors on non-planar scenes", retrieved on Jul. 30, 2010 at <<http://citeseerx.ist.psu.edu/viewdoc/download?doi=10.1.1.59.3077&rep=rep1&type=pdf>>, Proceedings of Workshop of the Austrian Association for Pattern Recognition, 2004, pp. 125-132.
Friedman, et al., "An Algorithm for Finding Best Matches in Logarithmic Expected Time", retrieved on Jun. 29, 2010 at <<http://delivery.acm.org/10.1145/360000/355745/p209-freidman.pdf?key1=355745&key2=3779787721&coll=GUIDE&dl=GUIDE& CFID=93370504&CFTOKEN=86954411>>, ACM Transactions on Mathematical Software, vol. 3, No. 3, Sep. 1977, pp. 209-226.
Furao, et al., "A Self-controlled Incremental Method for Vector Quantization", retrieved on Jul. 3, 2010 at <<http://www.isl.titech.ac.jp/~hasegawalab/papers/shen_prmu_sept_2004.pdf>>, Japan Science and Technology Agency, Journal: IEIC Technical Report, Institute of Electronics, Information and Communication Engineers, vol. 104, No. 290, 2004, pp. 93-100.
Grauman, et al., "The Pyramid Match Kernel: Discriminative Classification with Sets of Image Features", retrieved on Jul. 30, 2010 at <<http://citeseerx.ist.psu.edu/viewdoc/download?doi=10.1.1.100.253&rep=rep1&type=pdf>>, IEEE, Proceedings of International Conference on Computer Vision (ICCV), Beijing, China, Oct. 2005, pp. 1458-1465.
Guttman, "R-Trees: A Dynamic Index Structure for Spatial Searching", retrieved on Jul. 30, 2010 at <<http://citeseerx.ist.psu.edu/viewdoc/download?doi=10.1.1.131.7887&rep=rep1&type=pdf>>, ACM, 1984, pp. 47-57.
He, et al., "An Investigation of Using K-d Tree to Improve Image Retrieval Efficiency", retrieved on Jul. 30, 2010 at <<http://www.aprs.org.au/dicta2002/dicta2002_proceedings/He128.pdf>>, Digital Image Computing Techniques and Application (DICTA), Melbourne, Australia, Jan. 2002, pp. 1-6.
He, et al., "Learning and Inferring a Semantic Space from User's Relevance Feedback for Image Retrieval", retrieved on Jul. 30, 2010 at <<http://research.microsoft.com/pubs/69949/tr-2002-62.doc>>, ACM, Proceedings of International Multimedia Conference, Juan-les-Pins, France, 2002, pp. 343-346.
Henrich, et al., "The LSD Tree: Spatial Access to Multidimensional Point and Non-Point Objects", retrieved on Jul. 30, 2010 at <<http://citeseerx.ist.psu.edu/viewdoc/download?doi=10.1.1.68.9784&rep=rep1&type=pdf>>, Proceedings of the International Conference on Very large Data Bases, Amsterdam, 1989, pp. 45-54.
Indyk, et al., "Approximate Nearest Neighbors: Towards Removing the Curse of Dimensionality", retrieved on Jul. 30, 2010 at <<http://citeseerx.ist.psu.edu/viewdoc/download?doi=10.1.1.38.249&rep=rep1&type=pdf>>, ACM, Proceedings of Symposium on Theory of Computing, Dallas, TX, Apr. 1998, pp. 604-613.
Javidi, et al., "A Semantic Feedback Framework for Image Retrieval", retrieved on Jul. 30, 2010 at http://www.ijcee.org/papers/171.pdf>>, International Journal of Computer and Electrical Engineering, vol. 2, No. 3, Jun. 2010, pp. 417-425.

Jeong, et al., "Automatic Exaction of Semantic Relatonships from Images Using Ontologies and SVM Classifiers", Proceedings of the Korean Information Science Society Conference, vol. 34, No. 1(c), Jun. 2006, pp. 13-18.

Katayama, et al., "The SR-Tree: An Index Structure for High-Dimensional Nearest Neighbor Queries", retrieved on Jul. 30, 2010 at <<http://citeseerx.ist.psu.edu/viewdoc/download?doi=10.1.1.64.4381&rep=rep1&type=pdf>>, ACM, Proceedings of Internaltional Conference on Management of Data, Tucson, Arizona, 1997, pp. 369-380.

Kim, et al., "A Hierarchical Grid Feature Representation Framework for Automatic Image Annotation", retrieved on Jul. 7, 2010 at <<http://ieeexplore.ieee.org/stamp/stamp.jsp?tp=&arnumber=4959786>>, IEEE Computer Society, Proceedings of International Conference on Acoustics, Speech and Signal Processing (ICASSP), 2009, pp. 1125-1128.

Kushki, et al., "Query Feedback for Interactve Image Rerieval", at <<http://ieeexplore.ieee.org/xpl/freeabs_all.jsp?arnumber=1294956>>, IEEE, vol. 14, No. 15, May 2004, pp. 644-655.

Lepetit, et al., "Randomized Trees for Real-Time Keypoint Recognition", retrieved on Jul. 30, 2010 at <<http://citeseerx.ist.psu.edu/viewdoc/download?doi=10.1.1.92.4902&rep=rep1&type=pdf>>, IEEE Computer Society, Proceedings of Conference on Computer Vision and Pattern Recognition (CVPR), vol. 2, 2005, pp. 775-781.

Li, et al., "An Adaptive Relevance Feedback Image Retrieval Method with Based on Possibilistic Clustering Algorithm", retrieved on Jul. 30, 2010 at <<http://ieeexplore.ieee.org/stamp/stamp.jsp?arnumber=04021676>>, IEEE Computer Society, Proceedings of International Conference on Intelligent Systems Design and Applications (ISDA), 2006, pp. 295-299.

Likas, et al., "The global k-means clustering algorthm", retrieved on Jul. 30, 2010 at <<http://www.cs.uoi.gr/~arly/papers/PR2003.pdf>>, Elsevier Science Ltd., Pattern Recognition, vol. 36, 2003, pp. 451-461.

Linde, et al., "An Algorithm for Vector Quantizer Design", retrieved on Jul. 30, 2010 at <<http://148.204.64.201/paginas%20anexas/voz/articulos%20interesantes/reconocimiento%20de%20voz/cuantificacion%20vectorial/An%20algorithm%20for%20Vector%20Quantizer%20Design.pdf>>, IEEE Transactions on Communications, vol. COM-28, No. 1, Jan. 1980, pp. 84-95.

Lindeberg, et al., "Shape-Adapted Smoothing in Estimation of 3-D Depth Cues from Affine Distortions of Local 2-D Brightness Structure", retrieved on Jul. 30, 2010 at <<http://citeseerx.ist.psu.edu/viewdoc/download?doi=10.1.1.55.5090&rep=rep1&type=pdf>>, Springer-Verlag New York, Proceedings of European Conference on Computer Vision, Stockholm, Sweden, vol. 1, 1994, pp. 389-400.

Lloyd, "Least Squares Quantization in PCM", retrieved on Jul. 30, 2010 at <<http://citeseerx.ist.psu.edu/viewdoc/download;jsessionid=8A3C215650DD1680 BE51B35B421D21D7?doi=10.1.1.131.1338&rep=rep1&type=pdf>>, IEEE Transactions on Information Theory, vol. IT-28, No. 2, Mar. 1982, pp. 129-137.

Lowe, "Distinctive Image Features from Scale-Invariant Keypoints", retrieved on Jul. 30, 2010 at <<http://citeseerx.ist.psu.edu/viewdoc/download?doi=10.1.1.157.3843&rep=rep1&type=pdf>>, Kluwer Academic Publishers, Hingham, MA, vol. 60, No. 2, International Journal of Computer Vision, 2004, pp. 91-110.

Magalhaes, et al., "High-Dimensional Visual Vocabularies for Image Retrieval", retrieved on Jul. 7, 2010 at <<http://citeseerx.ist.psu.edu/viewdoc/download?doi=10.1.1.98.7027&rep=rep1&type=pdf>>, ACM, Proceedings of Conference on Research and Development in Information Retrieval, Amsterdam, NL, Jul. 27, 2007, pp. 815-816.

Mairal, et al., "Online Dictionary Learning for Sparse Coding", retrieved on Jul. 7, 2010 at <<http://www.di.ens.fr/~fbach/mairal_icml09.pdf>>, ACM, Proceedings of International Conference on Machine Learning, Montreal, CA, vol. 382, 2009, pp. 1-8.

Matas, et al., "Robust Wide Baseline Stereo from Maximally Stable Extremal Regions", retrieved on Jul. 30, 2010 at <<http://cmp.felk.cvut.cz/~matas/papers/matas-bmvc02.pdf>>, Proceedings of British Machine Vision Conference (BMVC), Cardiff, UK, 2002, pp. 384-393.

Max, "Quantizing for Minimum Distortion", retrieved on Jul. 30, 2010 at <<http://ieeexplore.ieee.org/stamp/stamp.jsp?tp=&arnumber=1057548&userType=inst>>, IEEE Transactions on Information Theory, vol. 6, No. 3, Mar. 1960, pp. 7-12.

Mehrotra, et al., "Feature-Based Retrieval of Similar Shapes", retrieved on Jul. 30, 2010 at http://ieeexplore.ieee.org/stamp/stamp.jsp?tp=&arnumber=344072>>, IEEE Computer Society, Proceedings of International Conference on Data Engineering, 1993, pp. 108-115.

Mikolajczyk, et al., "A Comparison of Affine Region Detectors", retrieved on Jul. 30, 2010 at <<http://citeseerx.ist.psu.edu/viewdoc/download?doi=10.1.1.108.595&rep=rep1&type=pdf>>, Kluwer Academic Publishers Hingham, MA, International Journal of Computer Vision, vol. 65, No. 1-2, 2005, pp. 43-72.

Mikolajczyk, et al., "A performance evaluation of local descriptors", retrieved on Jul. 30, 2010 at <<http://www.ai.mit.edu/courses/6.891/handouts/mikolajczyk_cvpr2003.pdf>>, IEEE Computer Society, Transactions on Pattern Analysis and Machine Intelligence, vol. 27, No. 10, 2005, pp. 1615-1630.

Mikolajczyk, et al., "Scale and Affine Invariant Interest Point Detectors", retrieved on Jul. 30, 2010 at <<http://www.robots.ox.ac.uk/~vgg/research/affine/det_eval_files/mikolajczyk_ijcv2004.pdf>>, Kluwer Academic Publishers, The Netherlands, International Journal of Computer Vision, vol. 60, No. 1, 2004, pp. 63-86.

Murthy, et al., "Content Based Image Retrieval using Hierarchical and K-Means Clustering Techniques", retrieved on Jul. 30, 2010 at <<http://www.ijest.info/docs/IJEST10-02-03-13.pdf>>, International Journal of Engineering Science and Technology, vol. 2, No. 3, 2010, pp. 209-212.

Nister, et al., "Scalable Recognition with a Vocabulary Tree", retrieved on Jul. 7, 2010 at <<http://citeseerx.ist.psu.edu/viewdoc/download?doi=10.1.1.61.9520&rep=rep1&type=pdf>>, IEEE Computer Society, Proceedings of Conference on Computer Vision and Pattern Recognition (CVPR), vol. 2, 2006, pp. 2161-2168.

Obdrzalek, et al., "Sub-linear Indexing for Large Scale Object Recognition", retrieved on Jul. 30, 2010 at <<http://cmp.felk.cvut.cz/~matas/papers/obdrzalek-tree-bmvc05.pdf>>, Proceedings of the British Machine Vision Conference (BMVC), London, UK, vol. 1, Sep. 2005, pp. 1-10.

Patane, et al., "The Enhanced LBG Algorithm", retrieved on Jul. 30, 2010 at <<http://www.google.com.sg/url?sa=t&source=web&cd=1& ved=0CBcQFjAA&url=http%3A%2F%2Fciteseerx.ist.psu.edu%2Fviewdoc%2Fdownload% 3Fdoi%3D10.1.1.74.1995%26rep%3Drep1%26type%3Dpdf&rct=j&q=The%20enhanced%20LBG%20algorithm&ei=QXpSTOyFEoyevQOQ35Qa&usg=AFQjCNGkfxm5Kgm4BalKO42_FpgsDADtyw>>, Pergamon, Neural Networks, vol. 14, 2001, pp. 1219-1237.

Qian, et al., "Gaussian Mixture Model for Relevance Feedback in Image Retrieval", at <<http://research.microsoft.com/asia/dload_files/group/mcomputing/2003P/ICME02-qf.pdf>>, In Proceedings of International Conference on Multimedia and Expo (ICME '02), Aug. 2002, pp. 1-4.

Rothganger, et al., "3D Object Modeling and Recognition Using Local Affine-Invariant Image Descriptors and Multi-View Spatial Constraints", retrieved on Jul. 30, 2010 at <<http://www-cvr.ai.uiuc.edu/ponce_grp/publication/paper/ijcv04d.pdf>>, Kluwer Academic Publishers Hingham, MA, International Journal of Computer Vision, vol. 66, No. 3, Mar. 2006, pp. 231-259.

Samet, "The Quadtree and Related Hierarchical Data Structure", retrieved on Jul. 30, 2010 at <<http://citeseerx.ist.psu.edu/viewdoc/download?doi=10.1.1.75.5407&rep=rep1&type=pdf>>, ACM, Computing Surveys, vol. 16, No. 2, Jun. 1984, pp. 187-260.

Sawhney, et al., "Efficient Color Histogram Indexing", retrieved on Jul. 30, 2010 at <<http://ieeexplore.ieee.org/stamp/stamp.jsp?tp=&arnumber=413532>>, IEEE. Proceedings of International Conference on Image Processing (ICIP), Austin, TX, vol. 2, Nov. 1994, pp. 66-70.

Schmid, et al., "Evaluation of Interest Point Detectors", retrieved on Jul. 30, 2010 at <<http://cs.grnu.edu/~zduric/cs774/Papers/Schmid-Evaluation-IJCV.pdf>>, Kluwer Academic Publishers, The Netherlands, International Journal of Computer Vision, vol. 37, No. 2, 2000, pp. 151-172.

Sclaroff et al., "Unifying Textual and Vsua Cues for Content-Based Image Retrieval on the World Wide Web", at <<http://www.csai.unipa.it/lacascia/papers/cviu99.pdf>>, Academic Press, vol. 75, No. 1/2, Aug. 1999, pp. 86-98.

Sellis, et al., "The R+-Tree: A Dynamic Index for Multidimensional Objects", retrieved on Jul. 30, 2010 at <<http://www.vldb.org/conf/1987/P507.PDF>>, Proceedings of the Conference on Very Large Data Bases, Brighton, 1987, pp. 507-518.

Sivic, et al., "Video Google: A Text Retrieval Approach to Object Matching in Videos", retrieved on Jul. 30, 2010 at <<http://www.robots.ox.ac.uk/~vgg/publications/papers/sivic03.pdf>>, IEEE Computer Society, Proceedings of International Conference on Computer Vision (ICCV), vol. 2, 2003, pp. 1-8.

Sproull, "Refinements to Nearest-Neighbor Searching in k-Dimensional Trees", Springer-Verlag NY, Algorithmica, vol. 6, 1991, pp. 579-589.

Tuytelaars, et al., "Matching Widely Separated Views Based on Affine Invariant Regions", retrieved on Jul. 30, 2010 at <<http://www.vis.uky.edu/~dnister/Teaching/CS684Fall2005/tuytelaars_ijcv2004.pdf>>, Kluwer Academic Publishers, The Netherlands, International Journal of Computer Vision, vol. 59, No. 1, 2004, pp. 61-85.

van Rijsbergen, "Information Retrieval", Butterworth-Heinemann, 1979, pp. 1-151.

White, et al., "Similarity Indexing: Algorithms and Performance", retrieved on Jul. 30, 2010 at <<http://citeseerx.ist.psu.edu/viewdoc/download?doi=10.1.1.48.5758&rep=rep1&type=pdf>> Proceedings of Conference on Storage and Retrieval for Image and Video Databases (SPIE), vol. 2670, San Jose, CA, 1996, pp. 62-75.

Yang, et al., "Linear Spatial Pyramid Matching Using Sparse Coding for Image Classification", retrieved on Jul. 7, 2010 at <<http://www.ifp.illinois.edu/~jyang29/papers/CVPR09-ScSPM.pdf>>, IEEE Computer Society, Conference on Computer Vision and Pattern Recognition (CVPR), 2009, Miami, FLA, pp. 1-8.

Yu, et al., "Adaptive Document Clustering", retrieved on Jul. 30, 2010 at <<http://74.125.155.132/scholar?q=cache:nleqYBgXXhMJ:scholar.google.com/&hl=en&as_sdt=2000>>, ACM, Proceedings of International Conference on Research and Development in Information Retrieval, Montreal, Quebec, 1985, pp. 197-203.

Zhou., et al., "Unifying Keywords and Visual Contents in Image Retrieval", at <<http://www.ifp.uiuc.edu/~xzhou2/Research/papers/Selected_papers/IEEE_MM.pdf>>, IEEE, 2002, pp. 11.

Office action for U.S. Appl. No. 12/938,310, mailed on Oct. 25, 2012, Yang et al., "Adaptive Image Retrieval Database", 11 pages.

EXAMPLE HIERARCHICAL SPARSE CODEBOOK 214

TRAINING IMAGE FEATURE 1:
<LEAF NODE 1, LEAF NODE 3, ... LEAF NODE I>

TRAINING IMAGE FEATURE 2:
<LEAF NODE 2, LEAF NODE 5, ... LEAF NODE V>

TRAINING IMAGE FEATURE 3:
<LEAF NODE 12, ... LEAF NODE R>

.
.
.

TRAINING IMAGE FEATURE J:
<LEAF NODE 1, LEAF NODE 5, ... LEAF NODE W>

.
.
.

TRAINING IMAGE FEATURE M:
<LEAF NODE 1, LEAF NODE 5, ... LEAF NODE T>

FIG. 5

HIERARCHICAL SPARSE REPRESENTATION FOR IMAGE RETRIEVAL

BACKGROUND

Content-based image retrieval (CBIR) is gradually gaining momentum among Internet users nowadays. Some websites or search engines offer content-based image search services to Internet users. Specifically, a user submits a query image which is similar to his/her desired image to a website or search engine that provides CBIR services. Based on the query image, the website or search engine subsequently returns one or more stored images to the user. In order to allow efficient retrieval of stored images, the website or search engine represents or encodes the stored images in terms of image features. The website or search engine compares the image features of the stored images with image features of the query image, and retrieves one or more stored images that have image features similar to the image features of the query image.

Given the increasing popularity of CBIR services, academic or business communities have conducted significant research to determine an image representation that can provide efficient comparison and retrieval of images. A number of algorithms and strategies such as Bags of Words (BOW) have been proposed. However, these proposed algorithms or strategies are either restricted to a small set of images or are too computationally intensive to be performed in real time.

SUMMARY

This summary introduces simplified concepts of a hierarchical sparse codebook that may be used for content-based image retrieval, which is further described below in the Detailed Description. This summary is not intended to identify essential features of the claimed subject matter, nor is it intended for use in determining the scope of the claimed subject matter.

This application describes example techniques for generating a hierarchical sparse codebook. In one embodiment, training image features are received. A hierarchical sparse codebook is then generated based at least upon the training image features. The generated hierarchical sparse codebook includes multiple levels, with each level being associated with a sparseness factor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 5 illustrates a second example hierarchical sparse codebook.

DETAILED DESCRIPTION

Overview

As noted above, existing image search algorithms or strategies are limited to a small set of images, and are not scalable to include a large number of images. Furthermore, these algorithms or strategies require significant processing time and power, and therefore cannot be performed in real time.

This disclosure describes a hierarchical sparse coding using a hierarchical sparse codebook. The described codebook includes multiple levels. The described codebook allows a gradual determination/classification of an image feature into one or more groups or nodes by traversing the image feature through one or more paths to the one or more groups or nodes. That is, the described codebook compares an image feature of an image with nodes or nodal features of the nodes, beginning from a root level down to a leaf level of the codebook. Furthermore, the image feature is only compared with a subset of nodes at each level of the codebook, and therefore processing time is significant reduced relative to existing image search strategies. The number of determined/classified groups for the image feature is small/sparse in comparison with the total number of available groups or nodes in the codebook. Using the described codebook allows an efficient determination or classification of an image feature, and therefore provides an efficient and time-saving way of representing an image in terms of image features. Furthermore, image retrieval can be enhanced by comparing extracted features of an image with the codebook to obtain a representation of the image that can be used as an index or a reference for retrieving one or more stored images in a database.

Multiple and varied implementations and embodiments are described below. The following section describes an exemplary environment that is suitable for practicing various implementations. After this discussion, representative implementations of systems, devices, and processes for generating a hierarchical sparse codebook or representing an image using the hierarchical sparse codebook are described.

Exemplary Architecture

Figure 1:
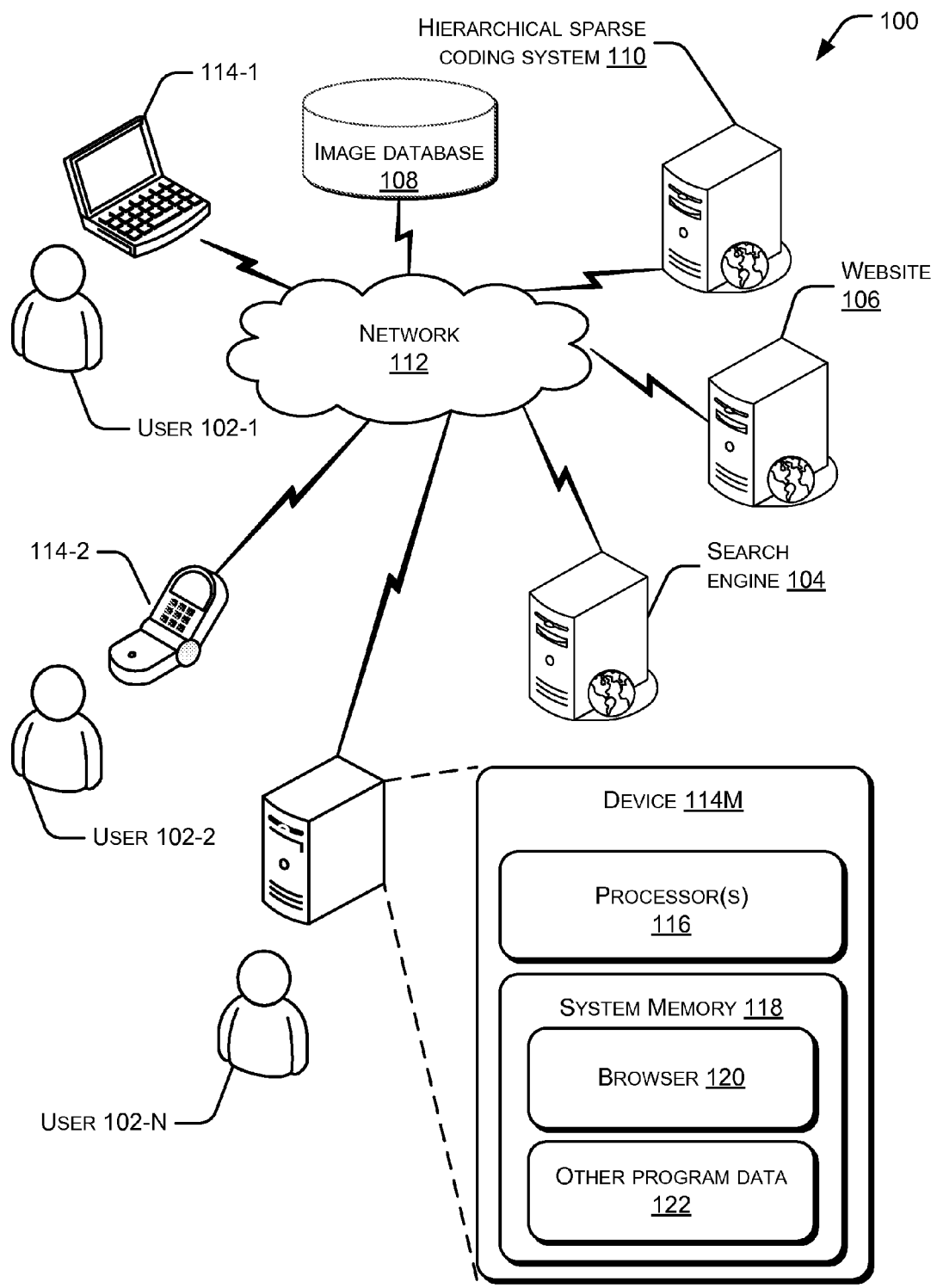
FIG. 1 illustrates an exemplary environment including an example hierarchical sparse coding system 110.

FIG. 1 illustrates an exemplary environment 100 usable to implement hierarchical sparse representation for image retrieval. The environment 100 includes one or more users 102-1, 102-2, ... 102-N (which are collectively referred to as 102), a search engine 104, a website 106, an image database 108, a hierarchical sparse coding system 110, and a network 112. The user 102 communicates with the search engine 104, the website 106 or the hierarchical sparse coding system 110 through the network 112 using one or more devices 114-1, 114-2, ... 114-M, which are collectively referred to as 114.

The devices 114 may be implemented as a variety of conventional computing devices including, for example, a server, a desktop personal computer, a notebook or portable computer, a workstation, a mainframe computer, a mobile computing device, a handheld device, a mobile phone, an Internet appliance, a network router, etc. or a combination thereof.

The network 112 may be a wireless or a wired network, or a combination thereof. The network 112 may be a collection of individual networks interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

In one embodiment, the device 114 includes a processor 116 coupled to a memory 118. The memory 118 includes a browser 120 and other program data 122. The memory 118 may be coupled to or associated with, and/or accessible to other devices, such as network servers, router, and/or other devices 114.

In one embodiment, the user 102 uses the browser 120 of the device 114 to submit an image query to the search engine 104 or the website 106. Upon receiving the image query from the user 102, the search engine 104 or the website 106 compares image query with images stored in the image database 108 and retrieves one or more stored images from the image database 108 using a hierarchical sparse codebook that is generated by the hierarchical sparse coding system 110. The search engine 104 or the website 106 then presents the one or more stored images to the user 102.

In another embodiment, the hierarchical sparse coding system 110 generates a hierarchical sparse codebook using images stored in the image database 108 either upon request from the search engine 104 or the website 106, or on a regular basis.

In still another embodiment, the hierarchical sparse coding system 110 encodes or represents an image received from the user 102, the search engine 104 or the website 106 based on the hierarchical sparse codebook. The hierarchical sparse coding system 110 may return a representation of the received image to the user 102, the search engine 104 or the website 106. Additionally or alternatively, the hierarchical sparse coding system 110 may store the representation of the received image or send the image representation to the image database 108 for storage. This image representation may further be stored as an index or a reference for the received image in the image database 108.

Figure 2:
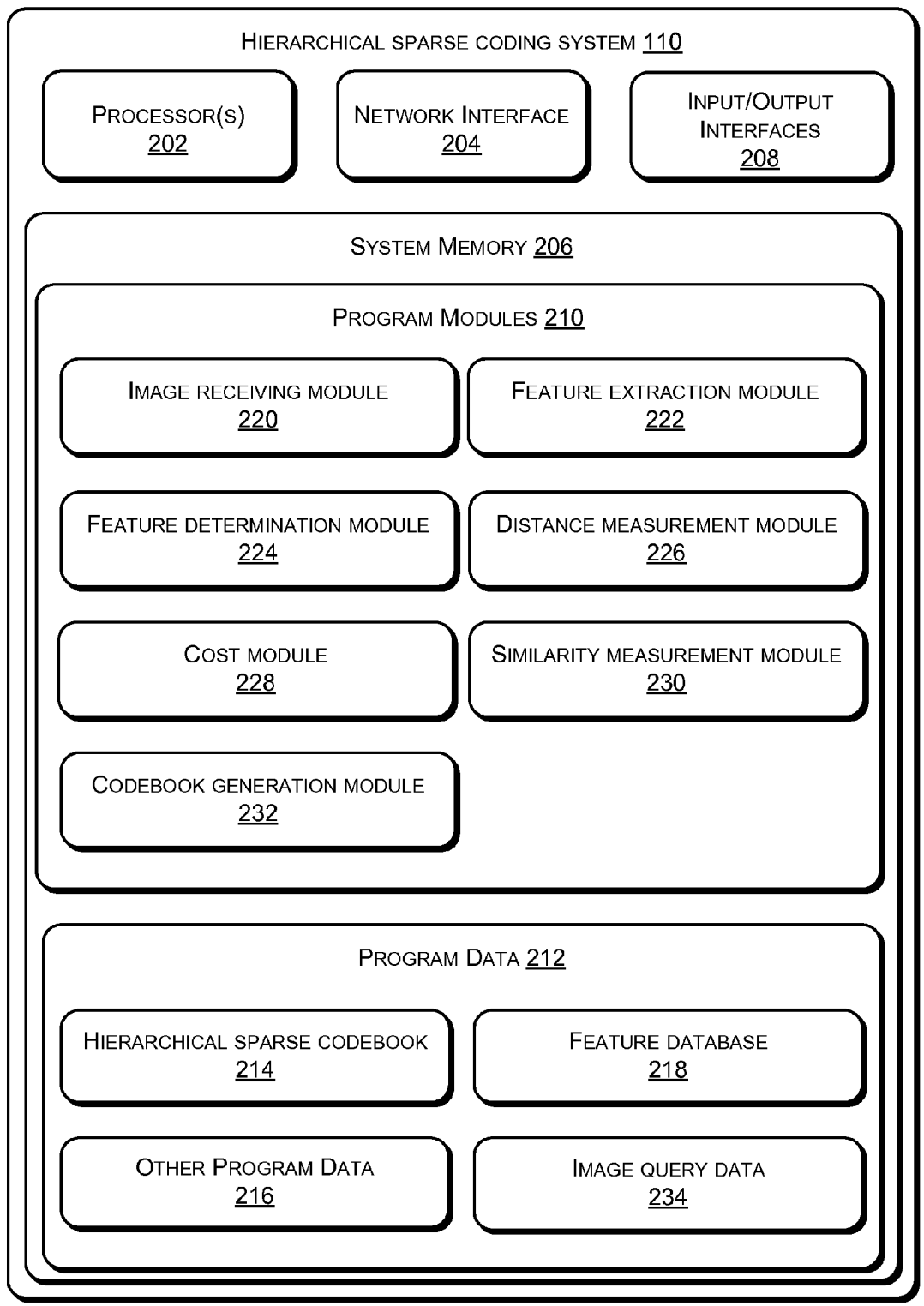
FIG. 2 illustrates the example hierarchical sparse coding system 110 of FIG. 1 in more detail.

FIG. 2 illustrates various components of the exemplary hierarchical sparse coding system 110 in more detail. In one embodiment, the system 110 can include, but is not limited to, a processor 202, a network interface 204, a system memory 206, and an input/output interface 208.

Figure 3:
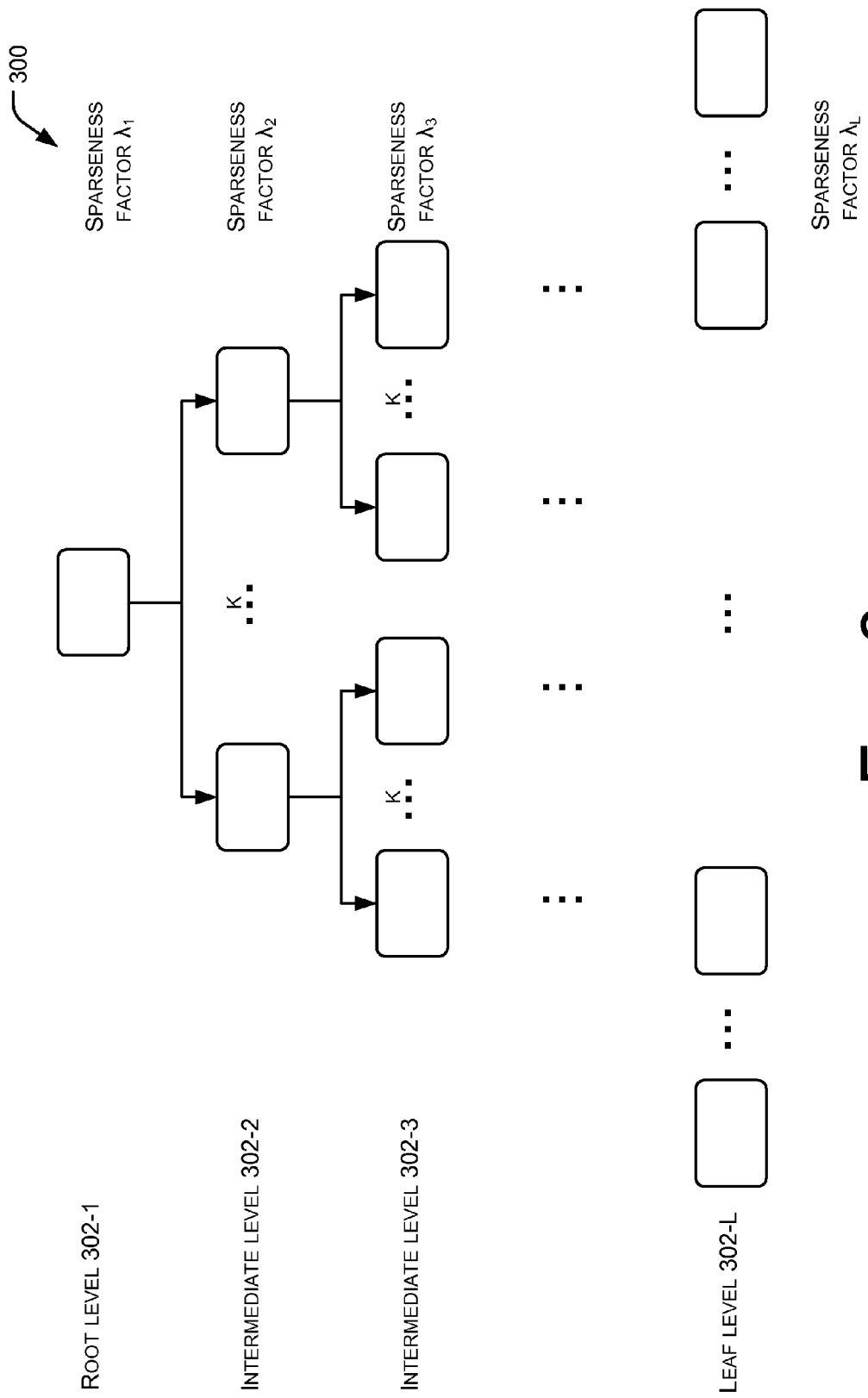
FIG. 3 illustrates a first example hierarchical sparse codebook.

The memory 206 includes a computer-readable media in the form of volatile memory, such as Random Access Memory (RAM) and/or non-volatile memory, such as read only memory (ROM) or flash RAM. The memory 206 includes program modules 210 and program data 212. The program data 212 may include a hierarchical sparse codebook 214 and other program data 216. Additionally, the memory 206 may further include a feature database 218 storing training image features that are used for generating the hierarchical sparse codebook 214. In one embodiment, the hierarchical sparse codebook 214 may include a hierarchical tree. For example, FIG. 3 shows an example of a hierarchical sparse codebook 214 in a form of a hierarchical tree. The hierarchical codebook may comprise L number of levels, including a root level 302-1, one or more intermediate levels 302-2, . . . 302-L−1, and a leaf level 302-L. Each node of the root level and the one or more intermediate levels may include K number of child nodes. Each node of the hierarchical codebook is associated with a nodal feature. As used herein, a nodal feature is a trained image feature associated with a node of the hierarchical codebook. The nodal feature may be in a form of a vector, for example. Additionally, each node may further be assigned a subset of the training image features. In one embodiment, each level of the hierarchical sparse codebook is associated with a sparseness factor to determine a degree of sparseness for each level. A degree of sparseness for a level is defined as an average number of nodes or nodal features used to represent each training image feature at that level divided by the total number of nodal features at that same level.

The program module 210 may further include an image receiving module 220. The image receiving module 220 may receive an image from the user 102, the search engine 104 or the website 106. The image may be a query image that the user 102 uses to find his/her desired image(s). Upon receiving the image, the image receiving module 220 may transfer the image to a feature extraction module 222, which extracts features that are representative of the image. The feature extraction module 222 may adopt one or more feature extraction techniques such as singular vector decomposition (SVD), Bag of Visual Words (BoW), etc. Examples of the features include, but are not limited to, scale-invariant feature transform (SIFT) features and intensity histograms.

Depending on which mode the system 110 is performing, the feature extraction module 222 may send the extracted features to a feature determination module 224, the feature database 218, or both.

Representing an Image Using a Hierarchical Sparse Codebook

In one embodiment, in response to receiving the extracted features, the feature determination module 224 determines one or more leaf nodes of the hierarchical sparse codebook 214 to represent each extracted feature. Specifically, the feature determination module 224 compares each extracted feature with nodal features associated with a subset of nodes of the hierarchical sparse codebook 214 level by level.

Table 1 shows a first example algorithm for representing an image using the hierarchical sparse codebook 214. The hierarchical sparse codebook 214 in FIG. 3 is one example. When an extracted feature arrives at the root level 302-1 in FIG. 3 or level 0 in Table 1 (below), the feature determination module 224 compares the extracted feature with each nodal feature associated with each node at next level 302-2, i.e., level 1 in Table 1.

TABLE 1

Algorithm 1: Encode an Image using a hierarchical sparse codebook

[Input]: Feature vector set $X = \{x_1, x_2, x_3, ... x_M\}$, e.g., M feature vectors extracted from the image l; Constructed hierarchical sparse codebook T
[Output]: Histogram representation h
[initialization]: Active set $A^l = \{v_1, v_2, v_3, ... v_k\}$ for tree level l = 1
[Main]
For i = 1 to M
    For l = 1 to L−1
        1. Measure a distance or a degree of overlap between feature vector $x_i$ and each nodal feature vector in the active set $A^l$;
        2. Generate active set $A^{l+1}$ by selecting a node or a nodal feature at tree level l+1 whose parent has a distance from or a degree of overlap with the feature vector $x_i$ respectively less than a predetermined distance threshold or greater than a predetermined overlap threshold in step 1;
        l = l + 1
    End For
    i = i + 1
End For The histogram representation h is calculated by counting number of times each node or nodal feature at level l = L of the codebook T is selected for all $X = \{x_1, x_2, x_3, ... x_M\}$.

The feature determination module 224 may employ a distance measurement module 226 to determine a distance or a degree of overlap between the extracted feature and each nodal feature. The distance measurement module 226 may measure the distance or the degree of overlap according to a predetermined distance metric. For example, if features (i.e., the extracted feature and the nodal feature) are expressed in terms of feature vectors, the predetermined distance metric may include computing a normalized Lp-distance between the extracted feature and the nodal feature, where p can be any integer greater than zero. In one embodiment, the predetermined distance metric may include computing a normalized L2-distance (i.e., Euclidean distance) or a normalized L1-distance (i.e., Manhattan distance) between the extracted feature and the nodal feature. Alternatively, the predetermined distance metric may include computing an inner product of the extracted feature and the nodal feature to determine a degree of overlap therebetween.

In response to determining the distance or the degree of overlap between the extracted feature and each nodal feature at level 302-2, the feature determination module 224 may select a node at level 302-2 whose parent has a distance from the extracted feature that is less than a predetermined distance threshold (e.g., 0.2). Alternatively, the feature determination module 224 may select a node at level 302-2 whose parent has a degree of overlap with the extracted feature that is greater than a predetermined overlap threshold (e.g., zero). The predetermined distance threshold or the predetermined overlap threshold can be adaptively adjusted for each level in order to control a degree of sparseness for each level. A degree of sparseness for a level is defined as an average number of nodes or nodal features used to represent each training image feature at that particular level divided by the total number of nodes or nodal features at that same level. The feature determination module 224 repeats distance measurement for those selected nodes at level 302-2 and node selection for child nodes of the selected nodes at level 302-3. In the above algorithm 1, the feature determination module 224 leaves those unselected nodes at level 302-2 and respective child nodes or branches untouched. More specifically, the feature determination module 224 does not perform any distance determination or node selection for the child nodes of the unselected nodes of level 302-2.

Once the leaf level 302-L of the codebook 214 is reached, one or more leaf nodes are selected according to the above algorithm and are used to represent the extracted feature by the feature determination module 224.

After comparing each extracted feature with the hierarchical sparse codebook 214, the feature determination module 224 may generate a histogram representation of the image. The histogram representation of the image may be generated by counting a number of times each node or nodal feature at a leaf level (i.e., level 302-L in FIG. 3 or level L−1 in Table 1) of the codebook 214 is selected for the extracted features of the images. The histogram representation may be used to represent the image, and may be stored in the image database 108 as an index or a comparison reference for the image.

In some embodiments, the feature determination module 224 may additionally or alternatively employ a cost module 228 to determine which nodes are selected and which nodes are not selected for the extracted feature at each level of the codebook 214. Specifically, the cost module 228 may include a cost function. Table 2 (below) shows a second example algorithm for representing an image using the hierarchical sparse codebook 214.

The hierarchical sparse codebook in FIG. 3 is used for illustration. When an extracted feature $x_i$ arrives at the root level 302-1 in FIG. 3 or level 0 in Table 2, an active set $A^1$ is initially set to include each nodal feature associated with each node at a next level 302-2, i.e., level 1. A cost function $|x_i - u_i A^I|_{L1} + \lambda |u_i|_{L1}$ is then minimized with respect to a response $u_i$. Each entry, $u_i^j$, in the response $u_i$ represents a response of the extracted feature $x_i$ to corresponding nodal feature $v_j$. After minimizing the cost function, a new active set $A^2$ may be created by selecting a node or a nodal feature in level 302-3 in FIG. 3 or level 2 in Table 2 whose parent at level 302-2 or level 1 gives a response $u_i^j$ greater than a predetermined response threshold. The processes of cost function minimization and nodal feature selection are repeated for level 302-3 in FIG. 3 or level 2 in Table 2, until leaf level (i.e., level 320-L in FIG. 3 or level L−1 in Table 2) of the codebook 214 is reached. One or more nodes or nodal features at the leaf level of the codebook 214 having a response with the extracted feature $x_i$ greater than a predetermined response threshold may be selected to represent the extracted feature $x_i$.

Upon representing each extracted feature of the image using one or more nodes or nodal features at the leaf level of the codebook 214, the feature determination module 224 may generate a histogram representation of the image by summing and normalizing all responses of all $X=\{x_1, x_2, x_3, \ldots x_m\}$ at the leaf level of the codebook 214.

TABLE 2

Algorithm 2: Encode an Image using a hierarchical sparse codebook

[Input]: Feature vector set X = {$x_1, x_2, x_3, \ldots x_M$}, e.g., M feature vectors extracted from the image l; Constructed hierarchical sparse codebook T
[Output]: Histogram representation h
[initialization]: Active set $A^l$ = {$v_1, v_2, v_3, \ldots v_k$} for tree level l = 1
[Main]
For i = 1 to M
    For l = 1 to L−1
        1. Encode feature vector $x_i$ using the active set $A^l$ by minimizing a cost function $|x_i - u_i A^l|_{L1} + \lambda |u_i|_{L1}$, where λ is a parameter to control a degree of sparseness for representing the feature vector $x_i$ in terms of nodal feature vectors in $A^l$, and | |$_{L1}$ represents L1-norm.
        2. Generate active set $A^{l+1}$ by selecting a node or a nodal feature at tree level l+1 whose parent gives a response $u_i^j$ greater than a predetermined response threshold in step 1;
        l = l + 1
    End For
    i = i + 1
End For The histogram representation h is calculated by summing and normalizing all responses of all X = {$x_1, x_2, x_3, \ldots x_M$} at level l = L of the codebook tree T.

In some embodiments, a parameter λ, which controls the degree of sparseness, may be different for different levels of the codebook 214. For example, the parameter λ may be smaller for levels closer to the root level to allow more nodes or nodal features to be selected at those levels, and may gradually increase towards the leaf level of the codebook 214 to avoid over-number of selected nodes or nodal features at the leaf level. However, once the parameter λ is determined for each level, the parameter λ will not be modified until the codebook 214 is reconstructed or representations of the images are redone.

Although two example algorithms for representing an image are described above, the present disclosure is not limited thereto. Any algorithm that takes advantage of the described hierarchical sparse codebook 214 and represents each extracted feature of an image in terms of a sparse representation of one or more nodes or nodal features of the codebook 214 are covered in the present disclosure.

In one embodiment, an image may be represented using a combination of the above two algorithms. For example, algorithm 1 may first be used to find an active set up to a predetermined level of the codebook 214 for each image feature of the image. Algorithm 2 may then be used for the rest of the levels of the codebook 214 to obtain one or more nodes or nodal features at the leaf level of the codebook 214 for each image feature. Depending on values of the thresholds employed in algorithm 1, algorithm 1 can allow more nodes or nodal features to be selected for an image feature at each level, and therefore permits a broader exploration of nodal features to represent the image feature. This avoids pre-mature elimination of nodes or nodal features that are actually good candidates for representing the image feature. As the image feature traverses towards the leaf level however, algorithm 2 may be employed to limit number of selected nodes or nodal features at subsequent levels in order to prevent the number of selected nodes or nodal features (i.e., active set in Table 1) from going too large in size.

Upon obtaining a representation (e.g., histogram representation) of the image using one of the above algorithms, the feature determination module 224 may save the representation in the image database 108 and use this representation as an index for retrieving the image. Additionally or alternatively, this representation can be saved as a reference for comparison with representations of other images such as a query image during image retrieval.

In one embodiment, if the image is a query image submitted by the user 102, or forwarded by the search engine 104 or the website 106, the representation of the query image may be used to retrieve one or more stored images in the image database 108. For example, the representation of the query image may be compared with representations of images stored in the image database 108.

In another embodiment, a classifier may be used to classify the query image into one of a plurality of classes (e.g., automobile class) based on the representation of the query image. The classifier may include a neural network, a Bayesian belief network, support vector machines (SVMs), fuzzy logic, Hidden Markov Model (HMM), or any combination thereof, etc. The classifier may be trained on a subset of the representations of the images stored in the image database 108. Upon classifying the query image into a class, stored images within that class may be retrieved and presented to the user 102 according to respective frequencies of retrieval within a certain interval (e.g., the past one day, past one week, past one month, etc).

Additionally or alternatively, the representation of the query image may be compared with the representations of the stored images according to an image similarity metric. The image similarity metric is a measure of similarity between two images, and may return a similarity score to represent a relative resemblance of a stored image with respect to the query image. In one embodiment, a similarity measurement module 230 may be used to calculate a similarity score of a stored image with respect to the query image based upon the representation of the query image. For example, the similarity measurement module 230 calculates the similarity score based on a ratio of the number of common features in the representations of the query image and the stored image with respect to their average number of features.

In another embodiment, the similarity measurement module 230 may compute a correlation between the representation of the query image with representation of a stored image. For example, if an image is represented in the form of a histogram as described above, a correlation between a histogram representation of the query image and a histogram representation of a stored image may be computed to obtain a similarity score therebetween. In one embodiment, each of these histogram representations may first be normalized such that a respective area integral of the histogram representations are normalized to one, for example.

Based on the similarity scores of these stored images with respect to the query image, one or more stored images may be presented to the user 102, and arranged according to their similarity scores, for example, in a descending order of their similarity scores.

The program module 210 may further include a codebook generation module 232. The codebook generation module 232 generates the hierarchical sparse codebook 214 based on the training image features that are stored in the feature database 218. Additionally or alternatively, the codebook generation module 232 generates the hierarchical sparse codebook 214 based on images stored in the image database 108. In one embodiment, the codebook generation module 232 generates or reconstructs the hierarchical sparse codebook 214 on a regular basis, e.g., each day, each week, each month, or each year. Alternatively, the hierarchical sparse codebook 214 may be generated upon request, for example, from the search engine 104 or the website 106.

In still another embodiment, the hierarchical sparse codebook 214 is reconstructed based on performance of the codebook 214 in retrieving stored images in response to query images submitted from the user 102. For example, the program data 212 may further include image query data 234. The image query data 234 may include query images that have been submitted by one or more users 102 and stored images that were returned in response to the query images. Additionally or alternatively, the image query data 234 may include one or more stored images that have been selected by the users 102 in response to the query images. In one embodiment, the image query data 234 may further include similarity scores of the one or more selected images with respect to the query images. In an event that the image query data 234 includes the similarity scores of the selected images, the codebook 214 may be reconstructed in response to an average similarity score of the selected images in the image query data 234 being less than a predetermined similarity threshold. The predetermined similarity threshold may be set by an administrator or operator of the system 110 according to the accuracy and/or computing requirements, for example. For example, if a perfect match between a query image and a stored image has a similarity score of one, the codebook 214 may be reconstructed in response to the average similarity score being less than 0.7, for example.

Generating a Hierarchical Sparse Codebook

When a hierarchical sparse codebook 214 is generated or reconstructed, the codebook generation module 232 may receive a plurality of training image features from the feature database 218. Additionally or alternatively, the codebook generation module 232 may receive a plurality of images from the image database 108 and use the feature extraction module 222 to extract a plurality of image features for training purposes. Upon receiving the plurality of training image features, the codebook generation module 232 generates a hierarchical sparse codebook 214 according to a codebook generation algorithm. An example algorithm is illustrated in Table 3 (below).

For example, k number of nodes at level 1 are branched out from a root node at level 0. Each node at level 1 is associated with a nodal feature which is a training image feature randomly selected from the plurality of training image features. The plurality of training image features are then compared with each nodal feature at level 1 in order to assign a subset of training image features to the corresponding node at level 1. The subset of training image features assigned to a node includes a training image feature that has a response (e.g., a degree of overlap) to a nodal feature associated with that node greater than a predetermined response threshold, e.g., zero. Upon assigning a subset of training image features to a node at level 1, a set of k nodal features are trained with respect to the assigned subset of training image features for the node. Specifically, based on the assigned subset of training image features, a cost function is minimized with respect to the set of k nodal features:

$$\Sigma_i |x_H^j - u_H^j V_l^j|_{L1} + \lambda_l \Sigma_i |u_H^j|_{L1} \quad (1)$$

where
- $x_{ti}^j$ represents a training image feature in a subset $X_l^j$
- $V_l^j$ represents the set of k nodal features that are trained for node j at level l, i.e., $o_l^j$,
- $u_{ti}^j$ represents a response of $x_{ti}^j$ to $V_l^j$, and
- $\lambda_l$ represents a parameter to control a degree of sparseness for level l.

Upon obtaining the set of k nodal features that minimizes the above cost function for the node, this set of k nodal features are assigned to child nodes of the node at next level, i.e., level 2. These processes of cost function minimization and nodal feature assignment are repeated for each node at each level until each node at the leaf level of the codebook is assigned a nodal feature and a subset of training image features or leaf level of the codebook is reached. At this point, the hierarchical sparse codebook is generated.

TABLE 3

Algorithm 3: Generate a hierarchical sparse codebook

[Input]: Feature vector set X = {$x_1, x_2, x_3, ... x_N$}, e.g., N feature vectors from a set of training images
[Output]: K-branch tree T, level l = 0, 1, 2, ... L, each node being associated with a nodal feature vector v
[initialization]: Branch a root node (at level l = 0) into K nodes (at level l = 1), each of the K nodes at level l = 1 is randomly selected from the feature vector set X [Main]
For l = 1 to L−1
    1. For each node j at level l, i.e., $o_l^j$, collect a subset of X which has a response with a nodal feature vector associated with node $o_l^j$ greater than a predetermined response threshold, and is denoted as $X_l^j$;
    2. For each node j at level l, $o_l^j$, based on $X_l^j$, train a set of K nodal features $V_l^j$, by minimizing a cost function $\Sigma_i |x_{ti}^j - u_{ti}^j V_l^j|_{L1} + \lambda_l \Sigma_i |u_{ti}^j|_{L1}$ with respect to a visual codebook associated with node $o_l^j$, i.e., $V_l^j$, then child nodes of node $o_l^j$ at level l+1, are associated with nodal features of $V_l^j$;
    l = l + 1
End For The parameter $\lambda_l$ (which is also called a sparseness factor for level l) can be adaptively adjusted to change a degree of sparseness for the level l. In one embodiment, the parameter $\lambda_l$ or the degree of sparseness for a level is adjusted to be less than a predetermined threshold level. In another embodiment, the parameter $\lambda_l$ or the degree of sparseness for a level is adjusted to be within a predetermined range. In still another embodiment, the parameter $\lambda_l$ or the degree of sparseness for each level is collectively adjusted to obtain an overall degree of sparseness for the codebook and the plurality of training image features that is less than a predetermined overall threshold or within a predetermined overall range. The predetermined threshold level or the predetermined range may be the same or different for different levels.

In one embodiment, the above algorithm may further be modified. Specifically, after randomly assigning k number of training image features to be nodal features associated with the nodes at level 1, the algorithm may further train these nodal features to minimize the above cost function for level 1. Upon obtaining a set of optimized nodal features that minimize the cost function of level 1, the algorithm may assign these optimized nodal features to the nodes of level 1. The algorithm further assigns a subset of training image features that have responses greater than a predetermined response threshold to each node of level 1.

Additionally or alternatively, the algorithm may further specify that a training image feature that is assigned to a node is also a training image feature that has been assigned to the parent of the node.

Alternative Embodiments

Although the hierarchical sparse codebook 214 is described to include a hierarchical tree in the foregoing embodiments, the codebook 214 is not limited thereto. The hierarchical sparse codebook 214 can include any hierarchical structure. In one embodiment, the hierarchical sparse codebook 214 may initially include a hierarchical tree. After or during the training phase of the hierarchical sparse codebook 214, however, a node (i.e., a node at an intermediate level and/or a leaf level of the codebook 214) may be purged based on an average degree of overlap between associated training image features and corresponding nodal feature of the node. For example, a node may be purged if corresponding average degree of overlap between associated training image features and corresponding nodal feature is less than a predetermined threshold. Furthermore, this predetermined threshold may vary among different levels. In one embodiment, the predetermined threshold for average degree of overlap is lower at a higher level (i.e., a level closer to the root level of the codebook 214), and increases towards the leaf level of the codebook 214. This is because the number of training image features assigned to a node at the higher level is usually greater and a nodal feature associated with the node is more generalized with respect to the assigned training image features. Having a lower threshold therefore avoids pre-mature purging of the node at the higher level. On the other hand, a node at a lower level is usually assigned with a fewer number of training image features, and a corresponding nodal feature may be more specific to the assigned training image features. Therefore, the predetermined threshold associated with the node at the lower level can be higher to reflect a change from generality to specificity of nodal features from a high level to a low level of the codebook 214.

In another embodiment, the hierarchical sparse codebook may be a hierarchical structure having a plurality of levels, with each level having a predetermined number of nodes. Rather than having an equal number of intermediate child nodes for each node at one level, the number of intermediate child nodes of a node at that level may be determined upon the number of training image features assigned to that particular node. For example, the number of intermediate child nodes of a first node at one level is greater than the number of intermediate child nodes of a second node at the same level if the number of training image features assigned to the first node is greater than the number of training image features assigned to the second node. In essence, a node having a greater number of training image features is allocated more resources (i.e., child nodes) to represent these training image features while a node having a fewer number of training image features is allocated fewer resources, thereby optimizing the use of resources which are usually limited.

Exemplary Methods

Exemplary methods for generating a hierarchical sparse codebook or representing an image using the hierarchical sparse codebook are described with reference to FIGS. 4-6. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 4:
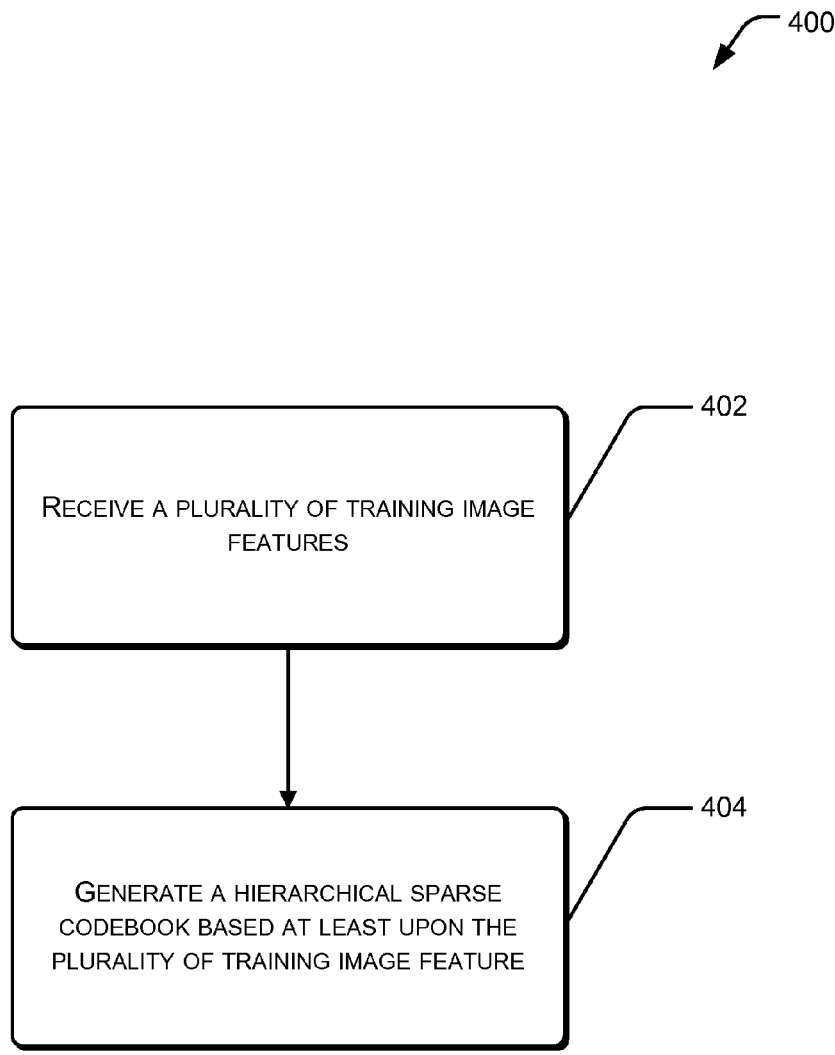
FIG. 4 illustrates an exemplary method of generating a hierarchical sparse codebook.

FIG. 4 illustrates an exemplary method 400 of generating a hierarchical sparse codebook.

At block 402, a plurality of training image features are received. This plurality of training image features may be obtained from one or more databases and/or one or more search engines. The plurality of training image features may be extracted from a plurality of images that are stored in the one or more databases and/or the one or more search engines.

At block 404, a hierarchical sparse codebook is generated based at least upon the plurality of training image features. The hierarchical sparse codebook may be generated to include a plurality of levels. In one embodiment, each of the plurality of levels may be associated with a sparseness factor as shown in FIG. 3, for example. Each level of the hierarchical sparse codebook is generated by adjusting corresponding sparseness factors to be less than respective predetermined thresholds or within respective predetermined ranges. Additionally or alternatively, the hierarchical sparse codebook may be generated by adjusting the sparseness factor of each level to obtain an overall degree of sparseness for the codebook and the plurality of training image features. In one embodiment, the sparseness factor of each level is adjusted to obtain an overall degree of sparseness that is less than a predetermined overall threshold or within a predetermined overall range. This predetermined overall threshold or predetermined overall range may be set by an administrator or an operator of the system 112 based on specified computing requirements or needs.

Additionally or alternatively, generating the hierarchical sparse codebook at block 404 may include representing each training image feature by a sparse number of leaf nodes or nodal features that are associated with the leaf nodes of the hierarchical sparse codebook. FIG. 5 shows an example of this hierarchical sparse codebook. Upon generating the hierarchical sparse codebook, each training image feature j is represented by a sparse number of nodes or nodal features at the leaf level of the codebook.

Figure 6:
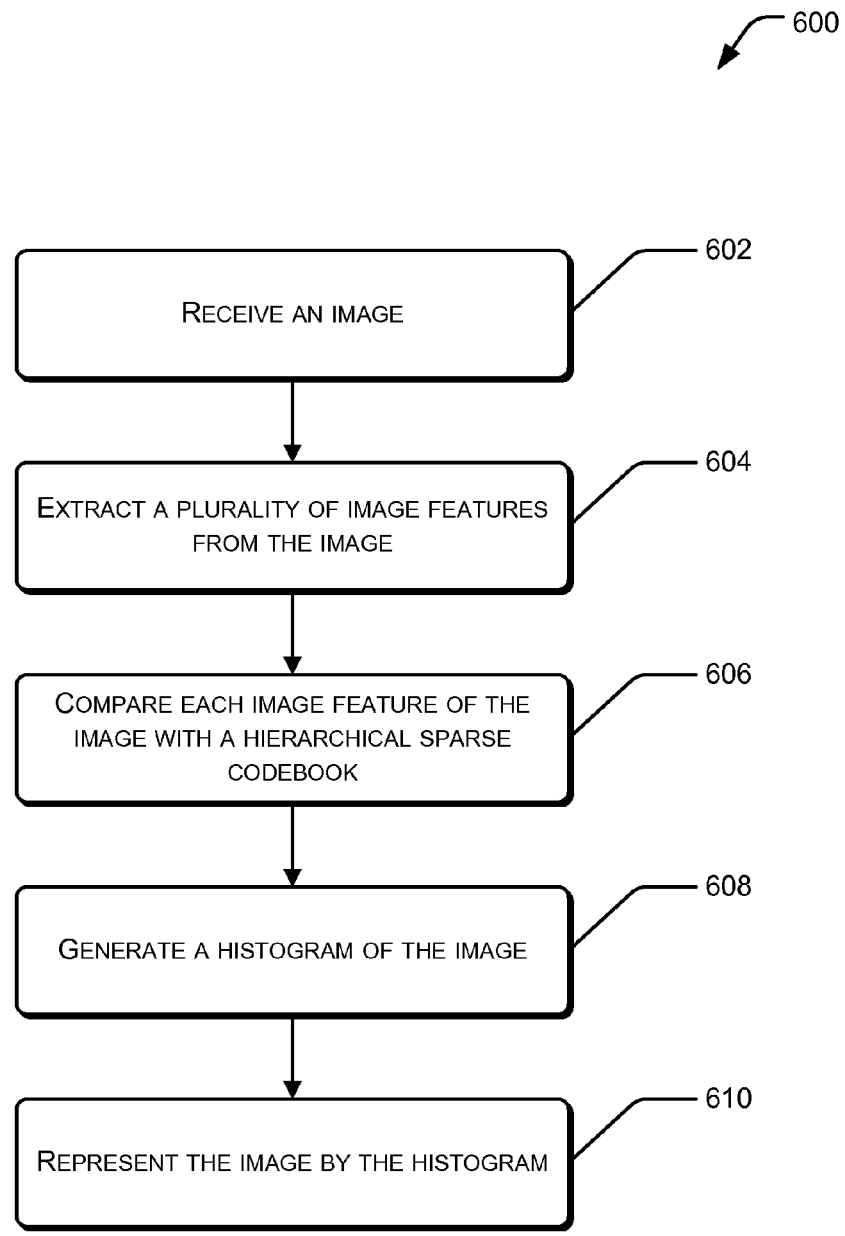
FIG. 6 illustrates an exemplary method of representing an image using a hierarchical sparse codebook.

FIG. 6 illustrates an exemplary method 600 of representing or encoding an image using a hierarchical sparse codebook.

At block 602, an image is received. This image may be received from a user for image query. Alternatively, this image may be received from a search engine or a website for encoding the image.

At block 604, a plurality of image features are extracted from the image.

At block 606, each image feature of the image is compared with a hierarchical sparse codebook to obtain one or more leaf-level features (i.e., nodal features at leaf level) of the codebook. The one or more leaf-level features represent a sparse code representation of the respective image feature.

At block 608, a histogram for the image is generated based upon the one or more leaf-level features of each image feature of the image. In one embodiment, the histogram represents respective number of times that each leaf-level feature of the codebook is encountered by the plurality of image features of the image.

At block 610, the image is represented by the histogram. The histogram may further be stored in a database as an index for the image. Additionally or alternatively, the histogram may be acted a reference for comparison between another image such as a query image during image retrieval. For example, the histogram of the query image may be compared with histograms of a subset of stored images in the database. In one embodiment, the comparison may be performed by computing correlations between the histogram of the query image and the histograms of the subset of stored images. One or more stored images having a correlation greater than a predetermined correlation threshold may be retrieved and presented to the user.

Any of the acts of any of the methods described herein may be implemented at least partially by a processor or other electronic device based on instructions stored on one or more computer-readable media. Computer-readable media can be any available media that can be accessed during generation of the hierarchical sparse codebook or encoding an image using the hierarchical sparse codebook. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Combinations of any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. One or more memory storage devices storing computer-executable instructions that, when executed by one or more processors, cause the one or more processors to perform acts comprising:
   receiving a plurality of training image features; and
   generating a hierarchical sparse codebook based at least upon the plurality of training image features, the generating comprising creating a plurality of levels for the hierarchical sparse codebook, each level being associated with a respective sparseness factor.

2. The one or more memory storage devices as recited in claim 1, wherein the generating further comprises adjusting the respective sparseness factor of each level to obtain a degree of sparseness which is less than a predetermined threshold or within a predetermined range.

3. The one or more memory storage devices as recited in claim 1, wherein the generating further comprises adjusting the respective sparseness factor of each level to obtain an overall degree of sparseness for the hierarchical sparse codebook, which is less than a predetermined threshold or within a predetermined range, the overall degree of sparseness.

4. The one or more memory storage devices as recited in claim 1, wherein the generating further comprises assigning an image feature set to a node of a level of the plurality of levels, the image feature set comprising a subset of the plurality of training image features.

5. The one or more memory storage devices as recited in claim 4, wherein the assigning comprises assigning a training image feature of the plurality of training image features to the node if a degree of overlap between the training image feature and a nodal feature of the node is greater than or equal to a predetermined threshold.

6. The one or more memory storage devices as recited in claim 1, wherein the plurality of levels comprises at least a root level, a first level and a second level.

7. The one or more memory storage devices as recited in claim 6, wherein the generating further comprises:
creating a first number of nodes at the first level, the first number of nodes comprising a first number of first-level nodal features;
adjusting the first number of first-level nodal features to minimize a cost of a first cost function based at least upon the plurality of training image features, the first cost function comprising a first sparseness function to control a degree of sparseness associated with representations of the plurality of training image features at the first level; and
for each of the first number of nodes at the first level, assigning a first-level nodal feature set based at least upon the plurality of training image features and an assignment scheme.

8. The one or more memory storage devices as recited in claim 7, wherein the generating further comprises:
for each of the first number of nodes at the first level,
generating a second number of nodes at the second level, the second number of nodes comprising a second number of second-level nodal features,
adjusting the second number of second-level nodal features to minimize a cost of a second cost function based at least upon the respective first-level nodal feature set, the second cost function comprising a second sparseness function to control a degree of sparseness associated with representations of the plurality of training image features at the second level; and
for each of the second number of nodes at the second level, assigning a second-level nodal feature set based at least upon the respective first-level nodal feature set and the assignment scheme.

9. The one or more memory storage devices as recited in claim 8, wherein the assignment scheme comprises a predetermined threshold, and wherein assigning the first-level nodal feature or assigning the second-level nodal feature comprises assigning a training image feature to a node if a degree of overlap between the training image feature and a nodal feature associated with the node is greater than or equal to the predetermined threshold.

10. The one or more memory storage devices as recited in claim 1, further comprising:
receiving an image query comprising an example image from a user;
extracting one or more image features from the example image;
comparing each of the one or more image features with the hierarchical sparse codebook to obtain one or more leaf-level features of the codebook;
generating a histogram for the example image based on the one or more leaf-level features of each of the one or more image features from the example image;
retrieving one or more database images based at least upon the histogram; and
presenting the one or more database images to the user.

11. The one or more memory storage devices as recited in claim 10, wherein the retrieving comprises:
computing correlations between the histogram of the example image with histograms of a subset of database images stored in a database; and
retrieving the one or more database images that have corresponding correlations greater than a predetermined correlation threshold.

12. A computer-implemented method for generating a hierarchical sparse codebook, the method comprising:
receiving a plurality of training image features; and
generating a hierarchical sparse codebook based at least upon the plurality of training image features, the generating comprising encoding each training image feature using a sparse number of nodal features that are associated with leaf nodes of the hierarchical sparse codebook.

13. The computer-implemented method as recited in claim 12, wherein the generating further comprises:
generating a plurality of levels for the hierarchical sparse codebook, each level comprising a predetermined number of nodes;
associating each node of each level with a nodal feature;
adjusting each nodal feature of each node to minimize a cost of a cost function of the respective level based at least upon an image feature set of a parent node of the respective node; and
assigning, to each node, a subset of the image feature set of the respective parent node.

14. The computer-implemented method as recited in claim 13, wherein the cost function of each level comprises a sparseness function defining a degree of sparseness of representation of each training image feature at the respective node level.

15. The computer-implemented method as recited in claim 13, wherein the assigning comprises:
for each node, obtaining a degree of overlap between the respective nodal feature and an image feature of the image feature set of the respective parent node;
assigning, to the respective node, the image feature of the image feature set of respective parent node if the degree of overlap is greater than a predetermined threshold.

16. The computer-implemented method as recited in claim 12, further comprising:
receiving an image query comprising an example image from a user;
extracting one or more image features from the example image;
comparing each of the one or more image features with the hierarchical sparse codebook to obtain one or more leaf-level features of the codebook;
generating a histogram for the example image based on the one or more leaf-level features of each of the one or more image features from the example image;
retrieving one or more database images based at least upon the histogram; and
presenting the one or more database images to the user.

17. The computer-implemented method as recited in claim 16, wherein the retrieving comprises:
computing correlations between the histogram of the example image with histograms of a subset of database images stored in a database; and retrieving the one or more database images that have corresponding correlations greater than a predetermined correlation threshold.

18. A computer-implemented method comprising:

receiving an image;

extracting a plurality of image features from the image;

comparing each image feature with a hierarchical sparse codebook to obtain one or more leaf-level features of the codebook, the one or more leaf-level features representing a sparse code representation of the respective image feature;

generating a histogram for the image based at least upon the one or more leaf-level features of each image feature of the image; and representing the image by the histogram.

19. The computer-implemented method as recited in claim 18, further comprising:

generating an index for the image based at least upon the histogram; and storing the index and the image in a database.

20. The computer-implemented method as recited in claim 18, wherein the image comprises an example image received from a user for image query, and wherein the method further comprises:

retrieving one or more database images based at least upon the histogram; and presenting the one or more database images to the user.

* * * * *